UNITED STATES PATENT OFFICE 2,542,706

BITUMINOUS COMPOSITION AND PROCESS OF MAKING THE SAME

Charles S. Reeve, Leonia, and Benjamin A. Anderton, Cliffside Park, N. J., assignors to Allied Chemical & Dye Corporation, New York, N. Y., a corporation of New York No Drawing. Application November 22, 1947, Serial No. 787,614

8 Claims. (Cl. 106—280)

This invention relates to bituminous compositions suitable for the surfacing of floors, waterproofing, application to exposed structures, formation of armor and paving of highways, and to processes for preparing such compositions.

One well known method for producing bituminous compositions suitable for surfacing of floors and waterproofing purposes is to mix hot molten bitumen with mineral filler in desired proportions and then permit the mixture to cool to form a solid mass which is referred to in the trade as a "mastic cake." This mastic cake is shipped to the point of use, where it is heated to render it fluid, and then usually mixed with mineral aggregate and, in some cases, with additional bitumen to produce the final bituminous composition for application. In the production of this mastic cake, special equipment of an expensive character and design is required to effect a thorough dispersion of mineral filler with the hot molten bitumen of the cake. The subsequent mixing of the mastic cake with additional bitumen and mineral aggregate to obtain a uniform mixture thereof is a laborious and time consuming operation.

In the preparation of paving mixtures for building highways it is common to proportion the constituents by weight, requiring elaborate equipment for preheating and weighing the aggregate and preheating and measuring the binder admixed therewith. The proportioning of these constituents at or near the right of way for the highway, in equipment which is necessarily of relatively small capacity, inherently involves the objection that errors in proportioning the constituents inevitably occur, resulting in the production of batches which vary in composition.

The production of a paving mixture at a central mixing plant so as to exert control over the proportioning of the constituents and to effect mixing with maximum economy is suggested in Patent 1,685,304 of September 25, 1938, which discloses the preproportioning and pre-mixing of an asphaltic mixture consisting of (1) sand or a mixture containing graded crushed stone, sand and filler, (2) powdered asphalt, and (3) an asphaltic flux. However, the mixture resulting from the process of this patent on standing becomes sticky and somewhat coherent and is therefore difficult to handle. It has also been suggested to coat aggregate with an emulsion of the soft bitumen, followed by the application thereto of a hard bitumen in powdered form which will not flux to any substantial extent with the soft bitumen for a considerable period of time. When such compositions are applied fluxing between the hard and soft bitumen takes place under the influence of solar heat. Such bituminous compositions have also been found difficult to handle, since they tend to become sticky and coherent on standing in stock piles or during shipment.

It is an object of this invention to provide a bituminous composition comprising solid bitumen, flux and mineral material suitable for flooring, protective armor, waterproofing purposes and paving, which can be made at a central plant by properly proportioning and pre-mixing the constituents thereof and which remains workable so that it is easily handled, the physical condition being similar to that of slightly moist sand or mixtures of mineral aggregates, and which composition upon the application of heat to cause blending of the bitumen and flux constituents then and only then acquires the property of setting to produce a solid mass such as a floor, slab or pavement suitable as a floored, armored or paved surface. Another object of this invention is to provide a process for producing such composition. Other objects and advantages of this invention will appear from the following detailed description thereof.

We have found that by mixing a hard pitch derived from coal tar or water-gas tar having a softening point ring and ball within the range of 200° to 400° F., in flake or granular form, a high-boiling coal tar or water-gas tar flux having the distillation characteristics hereinafter set forth, with mineral material in amount of from 65 to 95% by weight of mineral material to 5 to 35% by weight of pitch and flux oil combined, the amount of pitch being from 50 to 90% of the combined amounts of pitch and flux, a friable composition is produced which can be readily handled and which can be stored for long periods of time without setting and shipped in bulk to where it is desired to use the same, also without setting during shipping. It is only upon heating the mix that fluxing of the pitch and the high-boiling oil takes place to produce a binder for the mineral material; hence, when it is desired to apply the composition it is only necessary to heat it.

The preparation of the mix in accordance with my invention may be readily accomplished in simple conventional mixing apparatus under atmospheric conditions of temperature and pressure thereby eliminating heating of bitumen and the use of special, expensive equipment for producing the mastic mix of commerce.

The mineral material may be mineral filler, i. e. a mineral material a major portion of which passes a No. 200 sieve, or mineral aggregate such as crushed stone, crushed slag, gravel or sand, with or without fibrous material such as asbestos, or a mixture of filler and aggregate. When the mineral material consists substantially entirely of mineral filler or a mixture of mineral aggregate of the nature hereinafter set forth and filler, a mastic mix is produced which, as contrasted with the mastic cakes of commerce, can readily be handled, i. e. is in a friable workable condition, so that by the mere application of heat, without additional bitumen and mineral aggregate, it will produce a desired waterproofing floor or paving composition, as contrasted with the mastic cake of commerce, which, as previously pointed out, require additional labor and equipment for effecting mixing thereof with added bitumen and mineral aggregate.

If desired, the pitch and flux may be mixed with mineral filler and all or a portion of the mineral aggregate in the final composition it is intended to apply to the desired surface. Thus, if all the mineral material in the final composition is incorporated in the mix as produced, it may be prepared at a central mixing plant where proper control over the amounts of constituents may be exercised. Likewise the mastic mix may be made at a central mixing plant where proper control over the amount of admixed pitch, flux and mineral material may be exercised. The composition as mixed may be stored without danger of setting taking place during storage or subsequent shipping to its point of application. When it is desired to apply the composition it is only necessary to apply heat by the applicator so as to effect a fluxing of the pitch with the oil flux constituents of the mixture. Generally, heating of the mixture to a temperature of 250° to 300° F. while agitating is sufficient to effect blending of the oil flux with the solid pitch particles and the production of a mix having a cementitious binder uniformly distributed therethroughout. This requires only relatively simple heating equipment, and since the pitch and flux are already uniformly distributed throughout the aggregate, elaborate mixing equipment need not be used.

It is important that the pitch constituent of the mixture be a coal tar or water-gas tar pitch having a softening point ring and ball within the range of 200° to 400° F., and the pitch particles be in either flake or granular form, with not more than about 10% passing a No. 60 U. S. standard sieve. The flake particles of pitch should each not exceed about ⅛ inch in thickness and about ½ square inch in area. The average size of the largest particles of the granular pitch should not exceed about ¼ inch. The use of fine pitch particles, for example powdered pitch, would result in a composition in which during storage fluxing of the fine pitch particles with the flux oil will take place producing a somewhat sticky mix difficult to handle. On the other hand, the use of pitch particles substantially larger than those specified is considered uneconomical because it will require the application of heat for an inordinate period of time to effect the proper fluxing between the pitch and flux oil when it is desired to apply the composition.

The oil flux used should be a high-boiling oil derived from coal tar or water-gas having a specific gravity at 38° C.-15.5° C. of 1.05 to 1.20, preferably from 1.08 to 1.18. The distillation characteristics of the oil (A. S. T. M. Standard Method D 246-42) should be as follows: the percentage figures given are per cent by weight:

Substantially no distillate evolved when heated to 235° C.
When heated to 270° C., a maximum of 20% evolved, preferably a maximum of 10%
When heated to 315° C., a maximum of 30% evolved, preferably a maximum of 25%
When heated to 355° C., a maximum of 50% evolved, preferably a maximum of 40%
Residue at 355° C., at least 50%, preferably at least 60%.

The amount of oil to pitch used depends upon the character of the desired bituminous composition. In general, the amount of pitch and oil combined relative to the amount of mineral material will be within the limits of from 5 to 35% combined pitch and flux to 65 to 95% mineral material. Of the 5 to 35% combined pitch and flux the pitch in general will constitute from 50 to 95%, the remainder being flux oil, the relative amounts of pitch and flux being so chosen that the amount of flux seldom exceeds about 8% by weight of the total mix.

The amount of mineral material used and the character thereof will depend upon the nature of the bituminous composition desired. In producing a mastic mix the mineral material used should be mineral filler with or without mineral aggregate such as crushed rock, sand and also, if desired, fibrous material such as asbestos fibers. Then, if a bituminous mastic mix suitable for flooring, waterproofing, armor or protection of exposed surfaces is desired, the proportions of the constituents may be as follows:

| | Per cent |
|---|---|
| Combined pitch and flux | 10 to 17 |
| Mineral filler (passing a No. 200 sieve) | 7 to 30 |
| Mineral aggregate retained on a No. 200 sieve and passing a No. 10 sieve | 20 to 83 |
| Mineral aggregate retained on a No. 10 sieve | 0 to 50 |
| Asbestos fiber | 0 to 4 |

If a bituminous composition is desired for producing a mastic mix suitable for shipment as such and for mixing at the point of use with mineral aggregate to produce flooring, paving or other desired mixes, the proportions of the constituents should be as follows:

| | Per cent |
|---|---|
| Combined pitch and flux | 15 to 35 |
| Mineral filler | 20 to 50 |
| Sand (preferably passing a No. 4 sieve) | 30 to 50 |
| Asbestos | 0 to 5 |

If a paving mixture is desired, the composition may contain from 5 to 15% combined pitch and oil flux and from 85 to 95% by weight of mineral material consisting of from 0 to 3% asbestos fiber, from 0 to 20% mineral filler, from 10 to 95% mineral aggregate retained on a No. 200 sieve and passing a No. 10 sieve, and from 0 to 80% mineral aggregate retained on a No. 10 sieve. The mineral aggregate may be crushed stone, crushed gravel, crushed slag, gravel pebbles or sand. The mineral filler may be pulverized stone, clay, Portland cement, or silica.

The bituminous composition of this invention may be made by first mixing the mineral aggregate with the flux, then introducing the mineral filler and finally the pitch, while continuing the mixing. The constituents are added at atmospheric temperature, the mineral material preferably having been dried in any conventional manner before mixing with the pitch particles. The order of addition of the constituents, however, may be changed as desired. Upon continuing the mixing a workable mixture which can be readily handled as, for example, by shovelling, results.

It will be noted that the proportion of the flux in the mixture is relatively small, of the order of .25 to 7.5% by weight of the mixture. This amount, it has been found, does not result in the production of a sticky or coherent mass when the mix is allowed to stand in stock piles or during shipment. The pitch particles in the mixture, it has been found, remain practically unaffected by the flux and have no more effect on the workability of the mix than the corresponding sizes of mineral material present until sufficient heat is applied to cause blending thereof with the oil flux. That the application of heat to the mix causes such blending and fluxing to take place is indeed surprising in view of the large amount of mineral material and the small amount of flux present. We have found, however, that by employing pitch and oil fluxes of the character and in the amounts specified the mix does in fact remain in a workable state for long periods of time, say twelve months, permitting the production thereof at a central mixing plant and upon heating fluxing does in fact take place between the pitch and oil flux to produce a mix which upon cooling sets to form a solid slab eminently satisfactory for flooring, waterproofing, armoring and paving purposes.

The term "pitch" is used herein to mean coal tar pitch or water-gas tar pitch.

The following example is illustrative of a preferred embodiment of our invention. The materials used in carrying out this example were as follows:

Mineral filler obtained from dolomitic limestone having the following composition:

| | By weight |
|---|---|
| Passing a No. 40, retained on a No. 80 sieve | 4.0 |
| Passing a No. 80, retained on a No. 200 sieve | 22.1 |
| Passing a No. 200 sieve | 73.9 |

Building sand conforming with the following specification:

| | By weight |
|---|---|
| Passing ¼", retained on ⅛" sieve | 0.7 |
| Passing ⅛", retained on No. 40 sieve | 63.3 |
| Passing No. 40, retained on No. 80 sieve | 29.8 |
| Passing No. 80, retained on No. 200 sieve | 4.4 |
| Passing No. 200 sieve | 1.8 |

A high-boiling coal tar oil having a specific gravity at 38°–15.5° C. of 1.128 and having the following distillation characteristics, the percentage figures being in terms of per cent by weight:

| | |
|---|---|
| To 235° C | 0.0 |
| To 270° C | 5.7 |
| To 315° C | 18.3 |
| To 355° C | 43.0 |
| Residue at 355° C | 57.0 |

A flaked pitch having a softening point of 151.0° C. (303.8° F.) ring and ball and an average particle size of approximately ⅛ inch.

A dolomitic aggregate of which approximately

58% passed a ⅜", and were retained on ¼" and

42% passed a ¼", and were retained on ⅛" sieve.

Asbestos fibers, grade known commercially as "Grade 7M."

The constituents above mentioned were mixed in the following proportions, the figures being given in per cent by weight—

| | Per cent |
|---|---|
| Flaked fuel pitch | 7 |
| High-boiling coal tar oil | 3 |
| Asbestos | 2 |
| Building sand | 20 |
| Mineral filler | 20 |
| Dolomitic aggregate | 48 |

These constituents were mixed at room temperature and were added to the mixer in the following order: Mineral material, high-boiling oil flux, asbestos fiber, sand, flaked pitch and dolomitic aggregate. A workable mix slightly oily in character and having the particles of pitch distributed therethroughout in discrete relation was thus obtained. A portion of this mix was kept in a closed container. Upon observation after standing for twelve months it was found to be in the same condition as when first prepared. It could be manipulated very readily as easily as a loose stone sand mixture containing no binder. It was found that no appreciable fluxing action had taken place between the high-boiling oil and the hard pitch during this twelve months' storage.

When it was desired to apply the mixture a portion thereof was heated in an open pan, with continuous stirring until blending of the high-boiling oil flux and pitch had taken place and a substantially uniform mixture resulted. A uniformly coated hot mixture was thus prepared by heating with agitation to a temperature within the range of 250° to 300° F.

It will be understood the above example is given for illustrative purposes only and the invention is not to be limited except as defined in the appended claims.

What is claimed is:

1. A friable non-coherent cold mix comprising solid pitch particles selected from the group consisting of coal tar pitch and water-gas tar pitch said pitch particles having a softening point ring and ball within the range of 200° to 400° F., not more than about 10% of the particles passing a No. 60 sieve, the average dimension of the largest particles not exceeding about ¼ inch, an oil flux selected from the group consisting of water-gas tar oil and coal tar oil having the following distillation characteristics—

Substantially no distillate evolved when heated to 235° C.

When heated to 270° C. a maximum of 20% by weight evolved

When heated to 315° C. a maximum of 30% by weight evolved.

When heated to 355° C. a maximum of 50% by weight evolved and non-metallic mineral material in the proportions of 65 to 95% by weight of mineral material to 5 to 35% by weight of pitch and oil flux combined, said cold mix containing not less than 0.25% and not more than 7.5% oil flux by weight of the mixture, said cold mix upon mixing of the constituents thereof at atmospheric temperatures being in a workable condition and having the property of retaining this condition upon standing at atmospheric temperatures in stock piles.

2. A friable non-coherent cold mix comprising pitch selected from the group consisting of coal tar pitch and water-gas tar pitch said pitch having a softening point ring and ball within the range of 200° to 400° of particle size such that not more than about 10% passes a No. 60 sieve, the average dimension of the largest particles not exceeding about ¼ inch, an oil flux selected from the group consisting of water-gas tar oil and coal tar oil having a specific gravity at 38° C.–15.5° C. of from 1.05 to 1.20, and having the following distillation characteristics—

Substantially no distillate evolved when heated to 235° C.
When heated to 270° C. a maximum of 20% by weight evolved
When heated to 315° C. a maximum of 30% by weight evolved
When heated to 355° C. a maximum of 50% by weight evolved and non-metallic mineral material in the proportion of from 65 to 95% by weight of mineral material and 5 to 35% by weight of combined pitch and flux, said cold mix containing not less than 0.25% and not more than 7.5% oil flux by weight of the mixture.

3. A friable non-coherent cold mix comprising coal tar pitch particles having a softening point ring and ball within the range of 200° to 400° F., not more than about 10% of the particles passing a No. 60 sieve, the average dimension of the largest particles not exceeding about ¼ inch, a coal tar oil having a specific gravity at 38° C.–15.5° C. of from 1.08 to 1.18 and having the following distillation characteristics—

Substantially no distillate evolved when heated to 235° C.
When heated to 270° C. a maximum of 10% by weight evolved
When heated to 315° C. a maximum of 25% by weight evolved
When heated to 355° C. a maximum of 40% by weight evolved the combined amount of pitch and oil flux present in the composition being from 5 to 15% by weight and said cold mix containing not less than 0.25% and not more than 7.5% oil flux by weight of the mixture, the remainder being mineral material of the following composition—

| | Per cent |
|---|---|
| Mineral filler passing a No. 200 sieve | 0 to 20 |
| Mineral aggregate retained on a No. 20 sieve and passing a No. 10 sieve | 10 to 95 |
| Mineral aggregate retained on a No. 10 sieve | 0 to 80 |
| Asbestos fiber | 0 to 3 |

4. A friable non-coherent cold mix comprising water-gas tar pitch particles having a softening point ring and ball within the range of 200° to 400° F., not more than about 10% of the particles passing a No. 60 sieve, the average dimension of the largest particles not exceeding about ¼ inch, a water-gas tar oil having a specific gravity at 38° C.–15.5° C. of from 1.08 to 1.18 and having the following distillation characteristics—

Substantially no distillate evolved when heated to 235° C.
When heated to 270° C. a maximum of 10% by weight evolved
When heated to 315° C. a maximum of 25% by weight evolved
When heated to 355° C. a maximum of 40% by weight evolved the combined amount of pitch and oil flux present in the composition being from 5 to 15% by weight and said cold mix containing not less than 0.25% and not more than 7.5% oil flux by weight of the mixture, the remainder being mineral material of the following composition—

| | Per cent |
|---|---|
| Mineral filler passing a No. 200 sieve | 0 to 20 |
| Mineral aggregate retained on a No. 20 sieve and passing a No. 10 sieve | 10 to 95 |
| Mineral aggregate retained on a No. 10 sieve | 0 to 80 |
| Asbestos fiber | 0 to 3 |

5. A friable non-coherent cold mix suitable for use as flooring, waterproofing, and armor or protection of exposed surfaces comprising coal tar pitch particles having a softening point ring and ball within the range of 200° to 400° F., not more than about 10% of the particles passing a No. 60 sieve, the maximum sized particles not exceeding ⅛ inch in thickness and ½ square inch in area, a coal tar oil having a specific gravity at 38° C.–15.5° C. of from 1.08 to 1.18 and having the following distillation characteristics—

Substantially no distillate evolved when heated to 235° C.
When heated to 270° C. a maximum of 10% by weight evolved
When heated to 315° C. a maximum of 25% by weight evolved
When heated to 355° C. a maximum of 40% by weight evolved the combined amount of pitch and oil flux present being 10 to 17% by weight of the total composition and said cold mix containing not less than 0.25% and not more than 7.5% oil flux by weight of the mixture, the remaining 90 to 83% by weight of the composition consisting of mineral material in the following proportions—

| | Per cent |
|---|---|
| Mineral filler passing a No. 200 sieve | 7 to 30 |
| Mineral aggregate retained on a No. 200 sieve and passing a No. 10 sieve | 20 to 83 |
| Mineral aggregate retained on a No. 10 sieve | 0 to 50 |
| Asbestos fiber | 0 to 4 |

6. A friable non-coherent cold mix suitable for use as flooring, waterproofing, and armor or protection of exposed surfaces comprising water-gas tar pitch particles having a softening point ring and ball within the range of 200° to 400° F., not more than about 10% of the particles passing a No. 60 sieve, the maximum sized particles not exceeding ⅛ inch in thickness and ½ square inch in area, a water-gas tar oil having a specific gravity at 38° C.–15.5° C. of from 1.08 to 1.18 and having the following distillation characteristics—

Substantially no distillate evolved when heated to 235° C.
When heated to 270° C. a maximum of 10% by weight evolved
When heated to 315° C. a maximum of 25% by weight evolved
When heated to 355° C. a maximum of 40% by weight evolved the combined amount of pitch and oil flux present being 10 to 17% by weight of the total composition and said cold mix containing not less than 0.25% and not more than 7.5% oil flux by weight of the mixture, the remaining 90 to 83% by weight of the composition consisting of mineral material in the following proportions—

| | Per cent |
|---|---|
| Mineral filler passing a No. 200 sieve | 7 to 30 |
| Mineral aggregate retained on a No. 200 sieve and passing a No. 10 sieve | 20 to 83 |
| Mineral aggregate retained on a No. 10 sieve | 0 to 50 |
| Asbestos fiber | 0 to 4 |

7. A friable non-coherent cold mix comprising coal tar pitch particles having a softening point ring and ball within the range of 200° to 400° F., not more than about 10% of the particles passing a No. 60 sieve, the maximum sized particles not exceeding ⅛ inch in thickness and ½ square inch in area, a coal tar oil having a specific gravity at 38° C.–15.5° C. of from 1.08 to 1.18 and having the following distillation characteristics—

Substantially no distillate evolved when heated to 235° C.

When heated to 270° C. a maximum of 10% by weight evolved

When heated to 315° C. a maximum of 25% by weight evolved

When heated to 355° C. a maximum of 40% by weight evolved the total amount of pitch and flux being from 15 to 35% by weight of the total composition and said cold mix containing not less than 0.25% and not more than 7.5% oil flux by weight of the mixture, the remaining 85 to 65% by weight of the composition consisting of mineral material in the following proportions—

| | Per cent |
|---|---|
| Mineral aggregate | 20 to 50 |
| Sand | 30 to 50 |
| Asbestos | 0 to 5 |

8. A friable non-coherent cold mix comprising water-gas tar pitch particles having a softening point ring and ball within the range of 200° to 400° F., not more than about 10% of the particles passing a No. 60 sieve, the maximum sized particles not exceeding ⅛ inch in thickness and ½ square inch in area, a water-gas tar oil having a specific gravity at 38° C.–15.5° C. of from 1.08 to 1.18 and having the following distillation characteristics—

Substantially no distillate evolved when heated to 235° C.

When heated to 270° C. a maximum of 10% by weight evolved

When heated to 315° C. a maximum of 25% by weight evolved

When heated to 355° C. a maximum of 40% by weight evolved the amount of pitch and flux being from 15 to 35% by weight of the total composition and said cold mix containing not less than 0.25% and not more than 7.5% oil flux by weight of the mixture, the remaining 85 to 65% by weight of the composition consisting of mineral material in the following proportions—

| | Per cent |
|---|---|
| Mineral aggregate | 20 to 50 |
| Sand | 30 to 50 |
| Asbestos | 0 to 5 |

CHARLES S. REEVE.
BENJAMIN A. ANDERTON.

REFERENCES CITED

The following references are of record in the file of this patent:

UNITED STATES PATENTS

| Number | Name | Date |
|---|---|---|
| 1,531,723 | Alsdorf | Mar. 31, 1925 |
| 1,812,730 | West | June 30, 1931 |
| 2,349,445 | McGrane | May 23, 1944 |
| 2,349,446 | McGrane | May 23, 1944 |
| 2,356,870 | Miller | Aug. 29, 1944 |
| 2,395,041 | Fair | Feb. 19, 1946 |

Certificate of Correction

Patent No. 2,542,706                                                      February 20, 1951

CHARLES S. REEVE ET AL.

It is hereby certified that error appears in the printed specification of the above numbered patent requiring correction as follows:

Column 4, line 1, after the word "water-gas" insert *tar*; line 37, for "Then" read *Thus*; column 6, line 2, after ¼" insert the word and comma *sieve,*; column 7, line 9, for "400°" read *400° F.*; column 10, line 17, before "amount" insert *total*;

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*